United States Patent
Hanai et al.

(10) Patent No.: US 11,801,722 B2
(45) Date of Patent: Oct. 31, 2023

(54) SUSPENSION DEVICE

(71) Applicant: KYB Corporation, Tokyo (JP)

(72) Inventors: Makoto Hanai, Tokyo (JP); Takuhiro Kondo, Tokyo (JP)

(73) Assignee: KYB CORPORATION, Tokyo (JP)

( * ) Notice: Subject to any disclaimer, the term of this patent is extended or adjusted under 35 U.S.C. 154(b) by 51 days.

(21) Appl. No.: 17/612,318

(22) PCT Filed: May 20, 2020

(86) PCT No.: PCT/JP2020/019890
§ 371 (c)(1),
(2) Date: Nov. 18, 2021

(87) PCT Pub. No.: WO2020/241403
PCT Pub. Date: Dec. 3, 2020

(65) Prior Publication Data
US 2022/0242185 A1    Aug. 4, 2022

(30) Foreign Application Priority Data

May 30, 2019  (JP) .................. 2019-100834

(51) Int. Cl.
*B60G 11/08*   (2006.01)
*B60G 7/04*    (2006.01)
(Continued)

(52) U.S. Cl.
CPC .............. *B60G 7/04* (2013.01); *B60G 3/10* (2013.01); *B60G 11/08* (2013.01); *B60G 13/10* (2013.01)

(58) Field of Classification Search
CPC . B60G 7/04; B60G 3/10; B60G 11/08; B60G 13/10
See application file for complete search history.

(56) References Cited

U.S. PATENT DOCUMENTS 3,915,421 A      10/1975  Forestier
4,858,950 A  *   8/1989   Kajiwara ............... B60G 11/08
                                                280/6.15
(Continued)

FOREIGN PATENT DOCUMENTS

DE    24 06 835 A1     8/1975
JP    S57-198109 A    12/1982
(Continued)

OTHER PUBLICATIONS

International Search Report for PCT/JP2020/019890, dated Aug. 11, 2020 (5 pgs. with English translation).

*Primary Examiner* — Toan C To
(74) *Attorney, Agent, or Firm* — Smith, Gambrell & Russell, LLP (57) ABSTRACT

A suspension device includes a leaf spring and a buffer. The leaf spring applies an elastic force for relatively moving an unsprung member in a predetermined direction with respect to a body (sprung member) of a vehicle. The buffer includes a first expansion/contraction member, a second expansion/contraction member, an intermediate member, and a damping passage. The first and second expansion/contraction members form first and second gas chambers filled with gas therein and are expandable and contractible. An upper end and a lower end of the first and second expansion/contraction members are connected to the body. The intermediate member couples the first and second expansion/contraction members and is connected to the leaf spring. The damping passage allows the first and second gas chambers to communicate with each other, and applies resistance to flow of flowing gas. When one of the first and second expansion/contraction members expands, the other contracts.

8 Claims, 4 Drawing Sheets

(51) Int. Cl.
*B60G 3/10* (2006.01)
*B60G 13/10* (2006.01)

(56) References Cited

U.S. PATENT DOCUMENTS

| | | | | |
|---|---|---|---|---|
| 4,867,474 A * | 9/1989 | Smith | ......... | B60G 11/465 |
| | | | | 267/32 |
| 6,739,608 B2 * | 5/2004 | Warinner | ......... | B60G 11/30 |
| | | | | 280/124.163 |
| 9,550,402 B2 * | 1/2017 | Hinz | ......... | B60G 11/27 |
| 2001/0042967 A1 * | 11/2001 | Stenvall | ......... | B60G 11/12 |
| | | | | 280/124.163 |
| 2008/0079280 A1 | 4/2008 | Nakamura et al. | | |
| 2009/0283942 A1 | 11/2009 | Nakamura | | |

FOREIGN PATENT DOCUMENTS

| | | |
|---|---|---|
| JP | S64 70210 A | 3/1989 |
| JP | 2012-172817 A | 9/2012 |
| JP | 2008-087590 A | 4/2018 |

* cited by examiner

SUSPENSION DEVICE

TECHNICAL FIELD

The present invention relates to a suspension device.

BACKGROUND ART

Patent Literature 1 discloses a conventional suspension device. The suspension device is provided with a buffer including a pneumatic buffer main body, an output shaft, a sealing body, and a damping passage. The pneumatic buffer main body is formed in a cylindrical shape provided, at both ends, with pressure chambers filled with gas. Each pressure chamber is sealed by a sealing body which has elasticity and is provided so as to be expandable and contractible. In addition, the pressure chambers communicate with each other by the damping passage, and apply resistance to a flow of gas flowing through the damping passage. The size of each pressure chamber changes with expansion/contraction of the sealing body, and the gas alternately flows between the pressure chambers to generate a damping force.

CITATIONS LIST

Patent Literature

Patent Literature 1: JP 2012-122817 A

SUMMARY OF INVENTION

Technical Problems

Incidentally, the suspension device usually needs to be provided with a suspension spring that applies elastic force between a sprung member such as a body and an unsprung member such as a wheel. In a case where the suspension spring is provided in Patent Literature 1, the suspension spring needs to be provided separately from the buffer and attached to the vehicle. In this case, it is necessary to provide attachment portions for the buffer and the suspension spring respectively, which results in a complicated structure.

The present invention has been made in view of the above conventional circumstances, and an object of the present invention is to provide a suspension device capable of simplifying the structure.

Solutions to Problems

A suspension device of the present invention includes a leaf spring and a buffer. The leaf spring applies elastic force for relatively moving the unsprung member in a predetermined direction with respect to the sprung member of the vehicle. The buffer includes a first expansion/contraction member, a second expansion/contraction member, an intermediate member, and a damping passage. The first expansion/contraction member forms a first gas chamber filled with gas therein and is provided so as to be expandable and contractible. One end of the first expansion/contraction member is connected to the sprung member of the vehicle in an attached state. The second expansion/contraction member forms a second gas chamber filled with gas therein and is provided so as to be expandable and contractible. One end of the second expansion/contraction member is connected to the sprung member of the vehicle in an attached state. The intermediate member is disposed between the first expansion/contraction member and the second expansion/contraction member to couple the first expansion/contraction member and the second expansion/contraction member. The intermediate member is connected to the leaf spring in an attached state. The damping passage allows the first gas chamber and the second gas chamber to communicate with each other, and applies resistance to a flow of gas flowing between the first gas chamber and the second gas chamber. When one of the first expansion/contraction member and the second expansion/contraction member expands, the other contracts.

DESCRIPTION OF EMBODIMENT

An embodiment in which a suspension device of the present invention is embodied will be described with reference to the drawings. Note that, in the following description, an up-down direction and a left-right direction mean an up-down direction and a left-right direction in the vehicle, and indicate the up-down direction and the left-right direction illustrated in FIGS. 1 to 4, respectively.

First Embodiment

Figure 1:
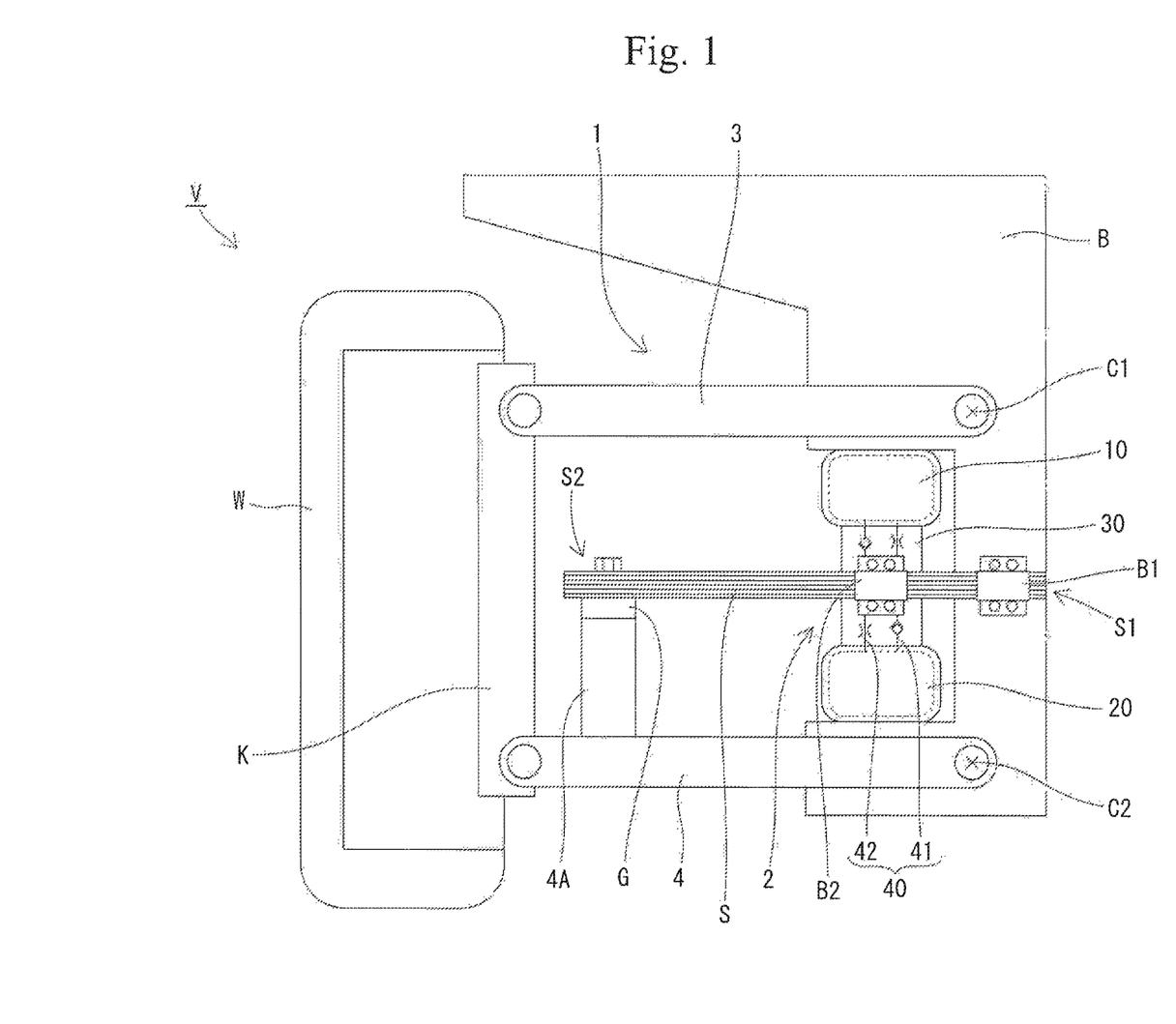
FIG. 1 is a view schematically illustrating a vehicle including a suspension device according to a first embodiment.
Figure 2:
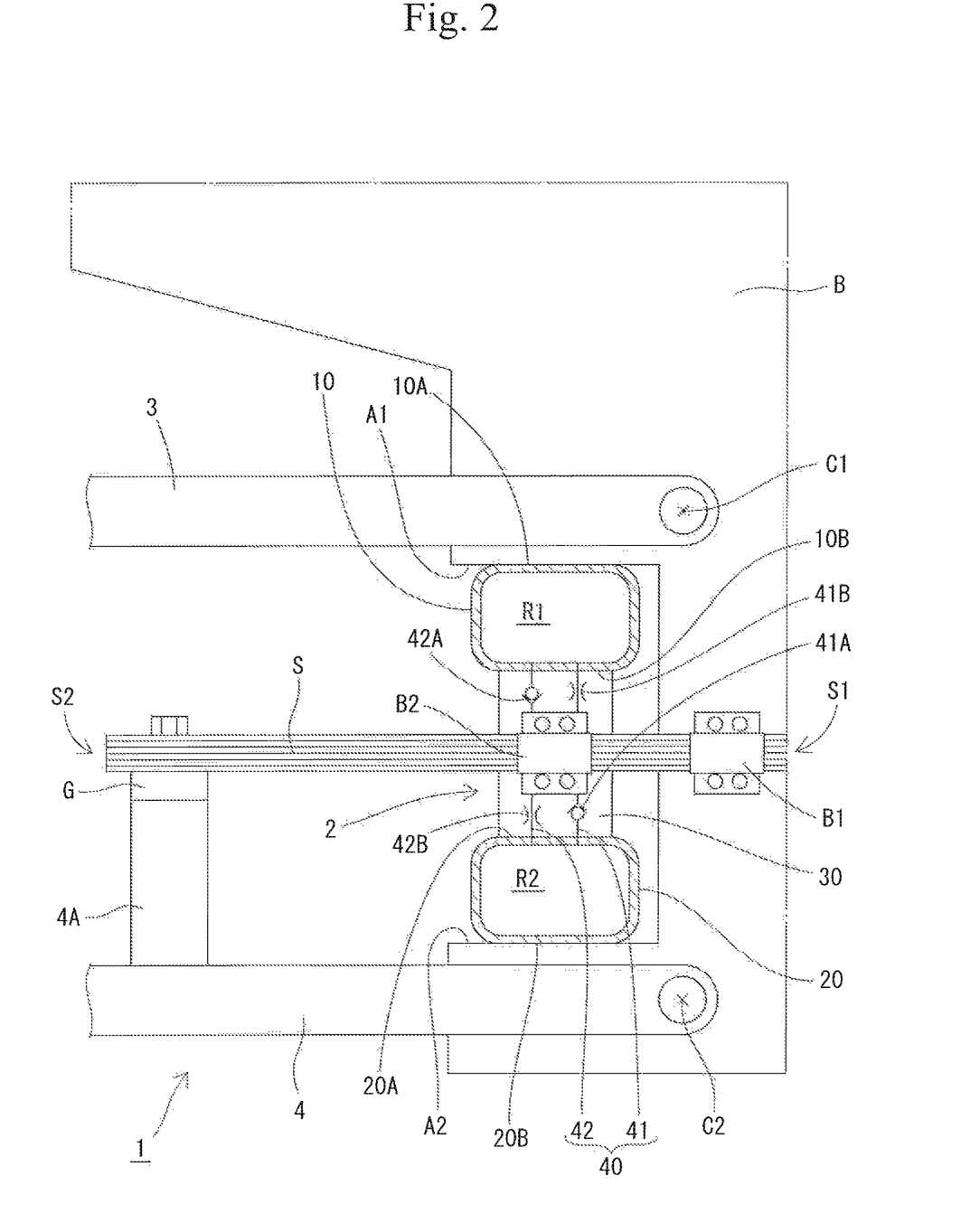
FIG. 2 is an enlarged view of a main part of FIG. 1.

As illustrated in FIGS. 1 and 2, a suspension device 1 of a first embodiment is provided in a vehicle V. The suspension device 1 supports a wheel W or the like serving as an unsprung member so as to be relatively movable in the up-down direction with respect to a body B serving as a sprung member of the vehicle V. The suspension device 1 includes a leaf spring S serving as a suspension spring and a buffer 2. The suspension device 1 includes two suspension arms 3 and 4. The suspension device 1 is a so-called double wishbone type in which the two suspension arms 3 and 4 are arranged side by side vertically. Each of the suspension arms 3 and 4 is rotatably supported on the body B. Specifically, the basal end side of the suspension arm 3 is rotatably supported around a rotation axis C1 extending in the front-rear direction of the vehicle V. The basal end side of the suspension arm 4 is rotatably supported around a rotation axis C2 provided below the rotation axis C1. Similarly to the rotation axis C1, the rotation axis C2 is set to extend in the front-rear direction of the vehicle V. The distal end sides of the suspension arms 3 and 4 extend in the left-right direction (In FIG. 1, leftward direction) of the vehicle V from the basal end side and are rotatably connected to a knuckle K on the wheel W side.

The leaf spring S applies elastic force in a direction in which the wheel W relatively moves downward with respect to the body B. The leaf spring S of the present embodiment is made of glass fiber reinforced plastic (GFRP). The leaf spring S is arranged so as to extend in the left-right direction of the vehicle V. One leaf spring S is provided for each pair of left and right wheels W. The leaf spring S has a central portion S1 connected to the body B, and left and right end portions S2 supported on the suspension arm 4. Specifically, as illustrated in FIGS. 1 and 2, the central portion S1 of the leaf spring S is fixed to the body B by a bracket B1. The end portion S2 of the leaf spring S is fixed to a fixing portion 4A of the suspension arm 4 via a rubber bush G.

In the vehicle V according to the first embodiment, the body B supported by the leaf spring S, various members and the like arranged fixedly with respect to the body B are sprung members, and various members arranged to be relatively movable with respect to the body B, such as the wheel W, the knuckle K, and the suspension arms 3 and 4, all of which are suspended from the leaf spring S, are unsprung members. The buffer 2 applies resistance to the relative movement between the sprung member group and the unsprung member group in a state where the elastic force of the suspension spring is acting, thereby suppressing and damping the relative movement. The buffer 2 is attached between the body B which is a sprung member and the leaf spring S which relatively moves partially with respect to the body B by being flexibly deformed.

As illustrated in FIGS. 1 and 2, the buffer 2 includes a first expansion/contraction member 10, a second expansion/contraction member 20, an intermediate member 30, and a damping passage 40. The first expansion/contraction member 10 forms a first gas chamber R1 filled with gas therein and is provided so as to be expandable and contractible. Specifically, the first expansion/contraction member 10 is a rolling lobe made of rubber having a cylindrical shape, and is provided to be extensible and contractible in the axial direction. In a state where the first expansion/contraction member 10 is attached to the vehicle V, an upper end 10A which is one end in the extension/contraction direction is connected to the body B. The lower end 10B, which is the other end of the first expansion/contraction member 10 in the extension/contraction direction, is connected to the intermediate member 30. The second expansion/contraction member 20 forms a second gas chamber R2 filled with gas therein and is provided so as to be expandable and contractible. In the present embodiment, the second expansion/contraction member 20 employs a rolling lobe made of rubber having a cylindrical shape that has substantially the same configuration and size as those of the first expansion/contraction member 10. In a state where the second expansion/contraction member 20 is attached to the vehicle V, a lower end 20B, which is one end in the extension/contraction direction, is connected to the body B. An upper end 20A, which is the other end of the second expansion/contraction member 20 in the extension/contraction direction, is connected to the intermediate member 30.

The intermediate member 30 is disposed between the first expansion/contraction member 10 and the second expansion/contraction member 20. As described above, the lower end 10B of the first expansion/contraction member 10 and the upper end 20A of the second expansion/contraction member 20 are connected to the intermediate member 30. As a result, the intermediate member 30 of the present embodiment couples the first expansion/contraction member 10 and the second expansion/contraction member 20 in series in the extension/contraction direction. The intermediate member 30 is connected to a position closer to the wheel than a fixing position of the leaf spring S on the body B side in the attached state. In the case of the present embodiment, as illustrated in FIGS. 1 and 2, the leaf spring S has the central portion S1 fixed to the body B by a bracket B1, and the end portion S2 fixed to the fixing portion 4A of the suspension arm 4. The intermediate member 30 is connected to a portion separated from the central portion S1 of the leaf spring S, which is a portion capable of relatively moving with respect to the body B. Specifically, the intermediate member 30 is connected by the bracket B2 to a portion separated from the central portion S1 of the leaf spring S toward the end portion S2 side.

The damping passage 40 allows the first gas chamber R1 and the second gas chamber R2 to communicate with each other, and applies resistance to the flow of gas flowing between the first gas chamber R1 and the second gas chamber R2. In the case of the present embodiment, the damping passage 40 includes a first damping passage 41 and a second damping passage 42 as illustrated in FIG. 2. The first damping passage 41 includes a check valve 41A which allows the flow of gas from the first gas chamber R1 to the second gas chamber P2 and inhibits the flow opposite thereto, and a flow rate control valve 41B which controls the flow rate of the flowing gas. The second damping passage 42 includes a check valve 42A which allows the flow of gas from the second gas chamber R2 to the first gas chamber R1 and inhibits the flow opposite thereto, and a flow rate control valve 42B which controls the flow rate of the flowing gas. In the present embodiment, the first damping passage 41 and the second damping passage 42 are configured to have different magnitude of the flow resistance of gas by the flow rate control of the flow rate control valves 41B and 42B. Specifically, the flow resistance of the second damping passage 42 is set to be larger than the flow resistance of the first damping passage 41. In the case of the present embodiment, the check valves 41A and 42A and the flow rate control valves 41B and 42B are provided integrally with the intermediate member 30.

The buffer 2 of the present embodiment is provided to be movable along the extending direction of the leaf spring S. Specifically, as illustrated in FIG. 2, in the buffer 2, the fixing position of the intermediate member 30 by the bracket B2 can be changed along the leaf spring S extending in the left-right direction.

Next, an operation of the suspension device 1 of the first embodiment will be described.

In the vehicle V, in a state where there is no relative movement of the wheel W with respect to the body B, the buffer 2 is in a state where the pressures of the first gas chamber R1 and the second gas chamber R2 are balanced. In this state, no gas flows between the first gas chamber R1 and the second gas chamber R2, and no damping force is generated.

Figure 3:
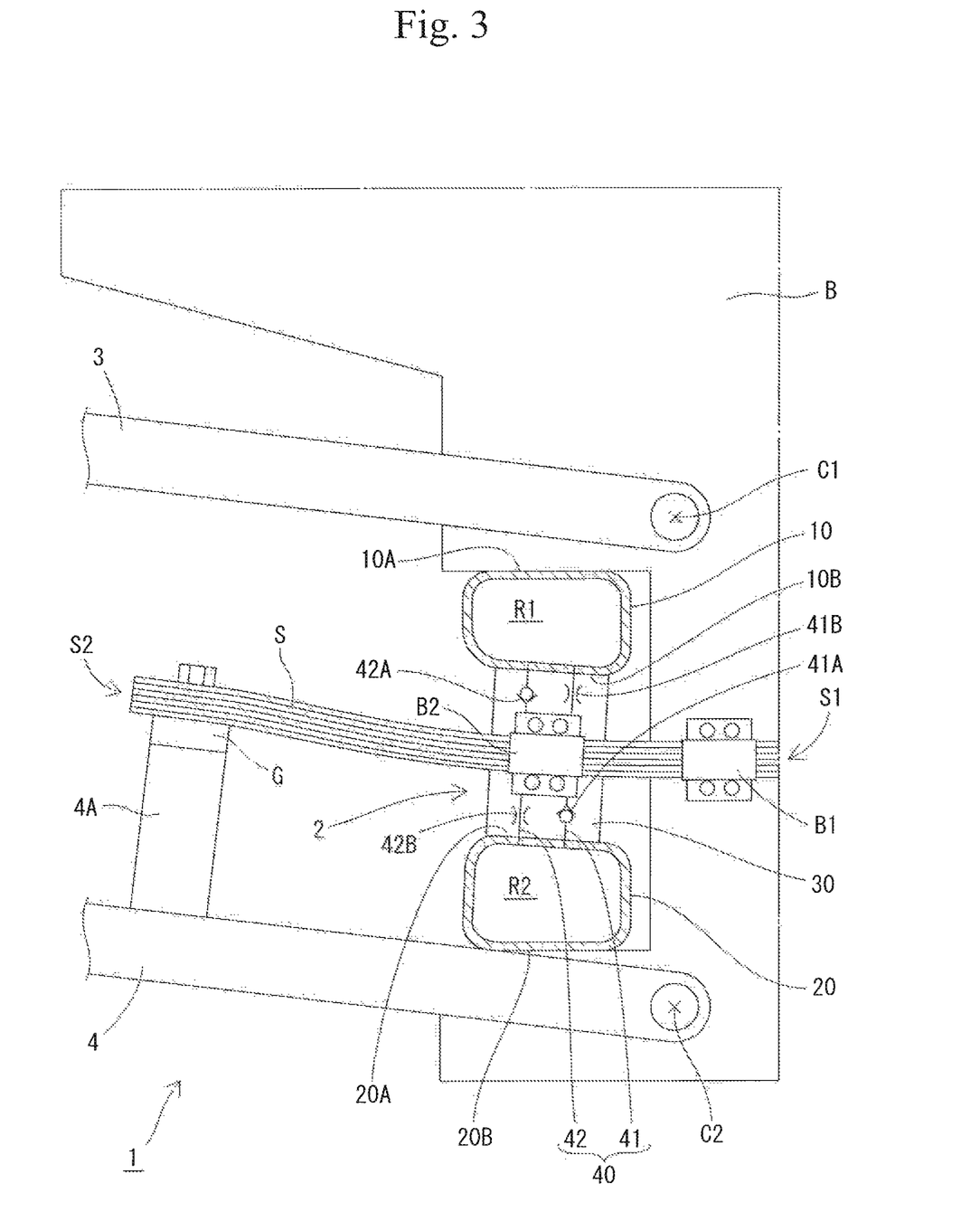
FIG. 3 is a view for explaining the action of the suspension device according to the first embodiment, and illustrates a state in which a wheel has moved upward from the state of FIG. 2.

In the vehicle V, when the wheel W moves upward relative to the body B by an input from a road surface or the like, for example, when the state illustrated in FIG. 2 is changed to the state illustrated in FIG. 3, the distal end sides of the suspension arms 3 and 4 move upward accordingly. Since the central portion S1 of the leaf spring S is connected to the body B by the bracket B1 and the end portion S2 is connected to the fixing portion 4A of the suspension arm 4, the leaf spring S is flexibly deformed such that the end portion S2 moves upward relative to the central portion S1.

Furthermore, the leaf spring S has a portion, between a portion of the central portion S1 connected to the body B by the bracket B1 and a portion fixed to the suspension arm 4 by the fixing portion 4A, connected to the intermediate member 30 of the buffer 2 by the bracket B2. Therefore, the intermediate member 30 moves upward accompanying the upward movement of the end portion S2 of the leaf spring S. Then, the first expansion/contraction member 10 contracts in the up-down direction, and the volume of the first gas chamber R1 decreases. On the other hand, the second expansion/contraction member 20 extends in the up-down direction, and the volume of the second gas chamber R2 increases. As a result, the gas in the first gas chamber R1 is compressed to increase the pressure, and the gas in the second gas chamber R2 is expanded to decrease the pressure. That is, a pressure difference is generated between the first gas chamber R1 and the second gas chamber R2. This pressure difference causes a flow of gas flowing through the damping passage 40.

Specifically, the gas passes through the first damping passage 41 and flows from the first gas chamber R1 to the second gas chamber R2. On the other hand, since the check valve 42A is closed, gas does not flow through the second damping passage 42. As a result, a damping force by the flow rate control valve 41B of the first damping passage 41 is generated, and the upward movement of the wheel W relative to the body B is suppressed.

Figure 4:
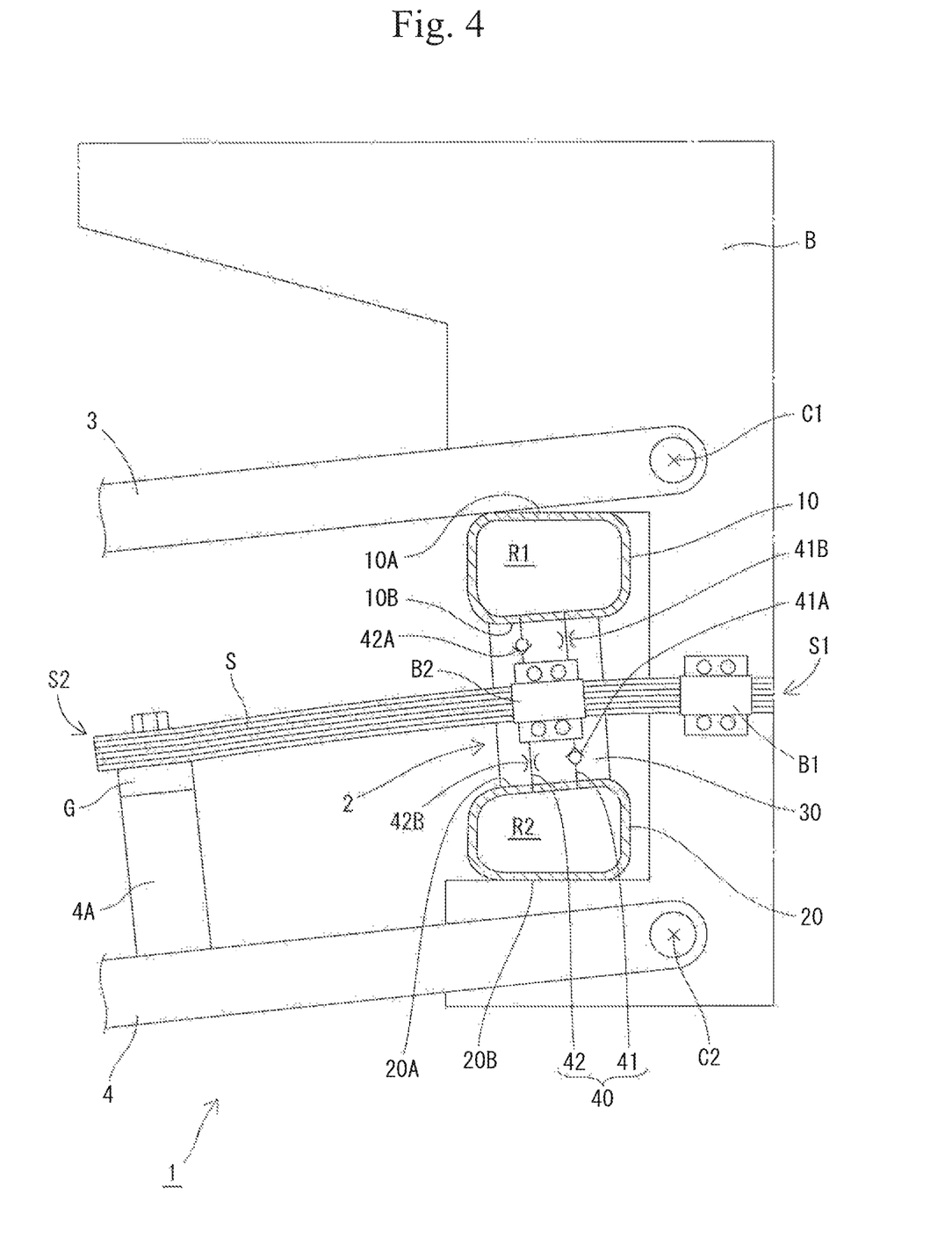
FIG. 4 is a view for explaining the action of the suspension device according to the first embodiment, and illustrates a state in which the wheel has moved downward from the state of FIG. 2.

On the other hand, in the vehicle V, when the wheel W moves downward relative to the body B, for example, when the state illustrated in FIG. 2 is chanced to the state illustrated in FIG. 4, the leaf spring S is flexibly deformed such that the end portion S2 moves downward relative to the central portion S1. Therefore, the intermediate member 30 moves downward. Accordingly, the first expansion/contraction member 10 extends in the up-down direction, and the volume of the first gas chamber R1 increases, and the second expansion/contraction member 20 contracts in the up-down direction, and the volume of the second gas chamber R2 decreases. As a result, the gas in the first gas chamber R1 is expanded to decrease the pressure, and the gas in the second gas chamber R2 is compressed to increase the pressure. That is, a pressure difference is generated between the first gas chamber R1 and the second gas chamber R2. This pressure difference causes a flow of gas flowing through the damping passage 40.

Specifically, the gas passes through the second damping passage 42 and flows from the second gas chamber R2 to the first gas chamber R1. On the other hand, since the check valve 41A is closed, gas does not flow through the first damping passage 41. As a result, a damping force by the flow rate control valve 42B of the second damping passage 42 is generated, and the downward movement of the wheel W relative to the body B is suppressed.

The suspension device 1 can change the magnitude of the damping force generated by the buffer 2 by moving the buffer 2 along the extending direction of the leaf spring S. Specifically, as illustrated in FIG. 2, in the buffer 2, the upper end 10A of the first expansion/contraction member 10 and the lower end 20B of the second expansion/contraction member 20 abut against the abutment surface portions A1 and A2 of the body B. The first expansion/contraction member 10 and the second expansion/contraction member 20 expand and contract between the abutment surface portions A1, A2 of the body B. and the intermediate member 30 to change the volumes of the gas chambers P1 and P2. The intermediate member 30 is displaced between the abutment surface portions A1 and A2 of the body B according to the magnitude of the deflection displacement of the leaf spring S. The deflection displacement of the leaf spring 3 is larger at a position farther from the bracket B1 which is a fixing position on the body B side, in other words, at a position closer to the end portion 32 which is a position closer to the wheel W.

Therefore, by moving the buffer 2 along the extending direction of the leaf spring S to change the fixing position of the bracket B2, the magnitude of the displacement of the intermediate member 30 when the deflection displacement occurs in the leaf spring S due to the relative movement between the body B and the wheel W of the vehicle V changes, and the magnitude of the change amount of the volume between the first expansion/contraction member 10 and the second expansion/contraction member 20 changes. As a result, the flow rate of the gas flowing through the damping passage 40 changes. Therefore, in the suspension device 1, the amount of expansion/contraction of the first expansion/contraction member 10 and the second expansion/contraction member 20 can be adjusted by moving the buffer 2 along the extending direction of the leaf spring S to adjust the magnitude of the displacement of the intermediate member 30, so that a damping force of a desired magnitude can be generated.

As described above, in the suspension device 1 of the first embodiment, the upper end 10A of the first expansion/contraction member 10 and the lower end 20B of the second expansion/contraction member 20, which are one ends of the two expansion/contraction members 10 and 20 of the buffer 2, are connected to the body B, and the intermediate member 30 coupling the two expansion/contraction members 10 and 20 is connected to the leaf spring S. According to this configuration, when deflection displacement occurs in the leaf spring S due to the relative movement between the body B and the wheel W of the vehicle V, one of the two expansion/contraction members 10 and 20 of the buffer 2 expands and the other contracts. As a result, one of the gases filled in the two gas chambers R1 and R2 is expanded and the other is compressed thus generating a pressure difference, and a flow of the gas flowing through the damping passage 40 is generated. Resistance is applied to the gas when flowing through the damping passage 40. The buffer 2 can cause this resistance force to act as a damping force for suppressing the relative movement between the body B and the wheels W of the vehicle V. Furthermore, in the suspension device 1, the leaf spring S serving as a suspension spring is connected to the intermediate member 30 of the buffer 2 to be integrated. Thus, the suspension spring and the buffer can be attached to the vehicle with a simple structure as compared with a case where the suspension spring and the buffer are separately provided.

Therefore, the suspension device 1 of the first embodiment can simplify the structure.

Furthermore, in the suspension device 1 of the first embodiment, the buffer 2 is provided so as to be movable in the extending direction of the leaf spring S, and thus the magnitude of the resistance force can be easily adjusted. As a result, the magnitude of the damping force can be easily adjusted.

The present invention is not limited to the first embodiment described above with reference to the drawings, and for example, the following embodiments are also encompassed within the technical scope of the present invention.

(1) The first embodiment has exemplified the form in which the suspension device is a double wishbone type, but the form and the like of the suspension device according to the present invention are not limited as long as it includes a leaf spring.

(2) The first embodiment has exemplified the form in which the leaf spring extends in the left-right direction of the vehicle, but the leaf spring according to the present invention may extend in a direction other than the left-right direction of the vehicle, such as the front-rear direction. The material of the leaf spring is not limited to GFRP, and may be other materials such as metal.

(3) The first embodiment has exemplified the form in which the leaf spring is fixed to the suspension arm on the lower side, but the present invention is not limited thereto. When there is a plurality of suspension arms, the leaf spring may be fixed to any suspension arm. Furthermore, the leaf spring may be fixed to an unsprung member other than the suspension arm. Moreover, the leaf spring may be directly attached to an unsprung member such as a suspension arm without interposing a rubber bush.

(4) The first embodiment has exemplified a form in which the central portion of the leaf spring is connected to the body and the end portion is connected to the suspension arm serving as the unsprung member, but the leaf spring according to the present invention may be configured such that one end portion thereof is connected to the body and the central portion or the other end portion is connected to the unsprung member such as the suspension arm.

(5) The first embodiment has exemplified a form in which the first expansion/contraction member and the second expansion/contraction member are provided with substantially the same configuration and size, but the configuration and size of the two expansion/contraction members may be different.

(6) The first embodiment has exemplified a form in which the first expansion/contraction member and the second expansion/contraction member are rolling lobes, but the first expansion/contraction member and the second expansion/contraction member may be members in other forms, such as metal bellows. In addition, the material of the first expansion/contraction member and the second expansion/contraction member is not limited to rubber, and other materials such as metal or resin may be adopted.

(7) The first embodiment has exemplified a form in which the first expansion/contraction member is provided so as to be movable along the extending direction of the suspension arm, but the second expansion/contraction member may be provided so as to be movable along the extending direction of the suspension arm, or both expansion/contraction members may be provided so as to be movable along the extending direction of the suspension arm.

(8) The first embodiment has exemplified a form in which two damping passages of the first damping passage and the second damping passage are provided as the damping passages, but this is not essential in the present invention. As a form of providing the damping passage, for example, only one damping passage that applies resistance may be provided for either the flow of gas flowing from the first gas chamber to the second gas chamber or the flow of gas flowing from the second gas chamber to the first gas chamber, and a passage that does not apply resistance may be provided for the other flow of gas.

(9) The first embodiment has exemplified a form in which the damping passage is formed in the intermediate member, but in the present invention, the damping passage may be formed separately from the intermediate member.

(10) In the first embodiment, the body of the vehicle has been exemplified as the sprung member, but the sprung member according to the present invention is not limited thereto.

(11) The first embodiment has exemplified a form in which the first expansion/contraction member and the second expansion/contraction member expand and contract with a predetermined directionality, that is, the first expansion/contraction member and the second expansion/contraction member are provided to be extensible and contractible in a predetermined direction, but this is not essential. At least one of the first expansion/contraction member and the second expansion/contraction member according to the present invention may expand and contract without having a predetermined directionality, as a balloon and the like.

REFERENCE SIGNS LIST 1 suspension device
2 buffer
3, 4 suspension arm
4A fixing portion
10 first expansion/contraction member
10A upper end of first expansion/contraction member
10B lower end of first expansion/contraction member
20 second expansion/contraction member
20A upper end of second expansion/contraction member
20B lower end of second expansion/contraction member
30 intermediate member
40 damping passage
41 first damping passage
41A, 42A check valve
41B, 42B flow rate control valve
42 second damping passage
A1, A2 abutment surface portion
B body (sprung member)
B1 bracket
B2 bracket
C1 rotation axis
C2 rotation axis
G rubber bush
K knuckle
R1 first gas chamber
R2 second gas chamber
S leaf spring
S1 central portion
S2 end portion
V vehicle
W wheel

The invention claimed is:

1. A suspension device comprising:
a leaf spring that applies an elastic force for relatively moving an unsprung member in a predetermined direction with respect to a sprung member of a vehicle; and
a buffer including,
a first expansion/contraction member that forms a first gas chamber filled with gas therein, is provided so as to be expandable and contractible, and has one end connected to the sprung member in an attached state,
a second expansion/contraction member that forms a second gas chamber filled with gas therein, is provided so as to be expandable and contractible, and has one end connected to the sprung member in an attached state,
an intermediate member that couples the first expansion/contraction member and the second expansion/contraction member and is connected to the leaf spring in an attached state, and
a damping passage that allows the first gas chamber and the second gas chamber to communicate with each other and applies resistance to a flow of the gas flowing between the first gas chamber and the second gas chamber, wherein
when one of the first expansion/contraction member and the second expansion/contraction member expands, the other contracts.

2. The suspension device according to claim 1, wherein the damping passage is provided with a flow rate control valve that controls a flow rate of the gas flowing therethrough.

3. The suspension device according to claim 1, wherein the damping passage is a closed passage between the first gas chamber and the second gas chamber.

4. The suspension device according to claim 3 wherein the closed passage is closed with a check valve.

5. The suspension device according to claim 1, wherein the damping passage is limited to gas communication between the first and second gas chambers only.

6. The suspension device according to claim 1, wherein the intermediate member extends vertically between a lower end of the first expansion/contraction member and an upper end of the second expansion/contraction member.

7. The suspension device according to claim 1, wherein the intermediate member couples the first and second expansion/contraction members in series in an extension/contraction direction.

8. The suspension device according to claim 1, wherein the leaf spring extends below a lower end of the first expansion/contraction member and above an upper end of the second expansion/contraction member.

* * * * *